No. 836,998. PATENTED NOV. 27, 1906.
E. SCHWEIGER.
ALTERNATING CURRENT MOTOR.
APPLICATION FILED MAY 2, 1904.

2 SHEETS—SHEET 1.

Witnesses.
Elnathan E. Briggs
Helen Oxford

Inventor:
Ernest Schweiger.
by Albert H. Davis
Atty.

No. 836,998. PATENTED NOV. 27, 1906.
E. SCHWEIGER.
ALTERNATING CURRENT MOTOR.
APPLICATION FILED MAY 2, 1904.

2 SHEETS—SHEET 2.

Witnesses
Inventor:
Ernest Schweiger.
by
Atty.

UNITED STATES PATENT OFFICE.

ERNEST SCHWEIGER, OF SCHENECTADY, NEW YORK, ASSIGNOR TO GENERAL ELECTRIC COMPANY, A CORPORATION OF NEW YORK.

ALTERNATING-CURRENT MOTOR.

No. 836,998.      Specification of Letters Patent.      Patented Nov. 27, 1906.

Application filed May 2, 1904. Serial No. 205,849.

*To all whom it may concern:*

Be it known that I, ERNEST SCHWEIGER, a subject of the King of Austria-Hungary, residing at Schenectady, county of Schenectady, State of New York, have invented certain new and useful Improvements in Alternating-Current Motors, of which the following is a specification.

My invention relates to alternating-current motors; and its object is to provide a novel structure for alternating-current motors which shall comprise means for properly compensating for the magnetizing-current, and thereby improving the power factor.

It is known that if a single-phase current be supplied to the primary member of an alternating-current motor and if the secondary member be provided with a commutator and short-circuiting brushes disposed on or near the line of magnetization of the primary member it is possible to impress upon the motor a second electromotive force by means of brushes displaced ninety electrical degrees from the short-circuiting brushes and that this electromotive force will produce a torque in the motor which can be controlled in amount and direction. Furthermore, it is known that if the magnitude and phase of this voltage impressed upon the commutator be of proper values the magnetizing-current of the motor may be compensated for and the power factor thereby improved. In order that the compensation should be the proper amount for varying speeds and loads of the motor, it is necessary to vary the compensating voltage.

My invention consists in providing a novel motor structure for automatically obtaining the results described above without employing a second set of commutator-brushes.

My invention will best be understood by reference to the accompanying drawings, in which—

Figure 1:
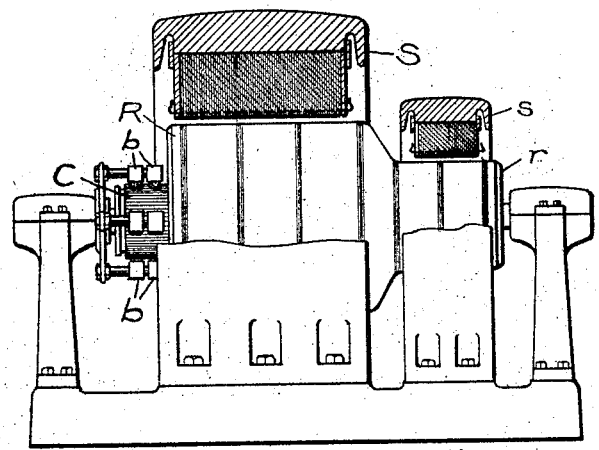
Figure 2:
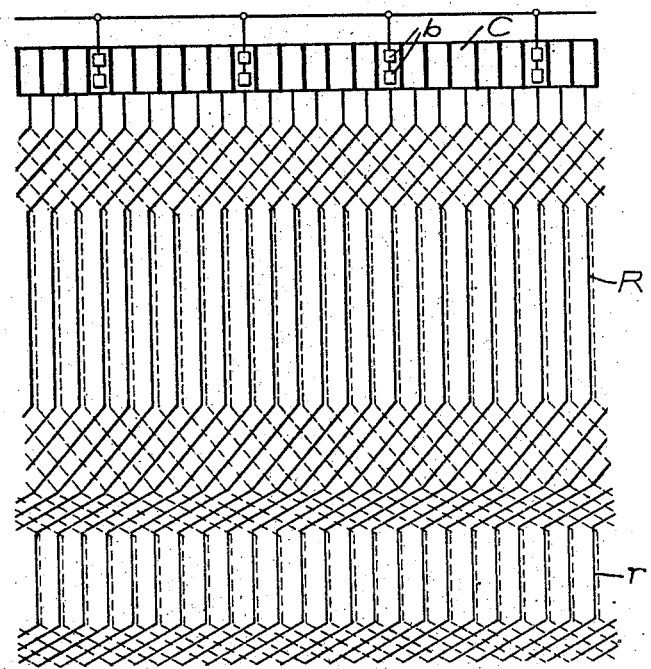
Figure 3:
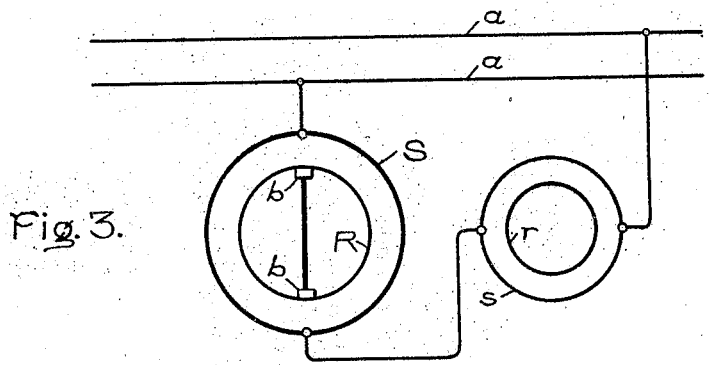
Figure 4:
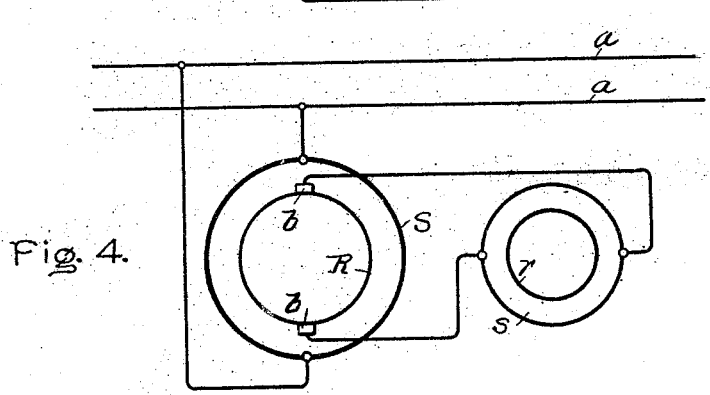
Figure 5:
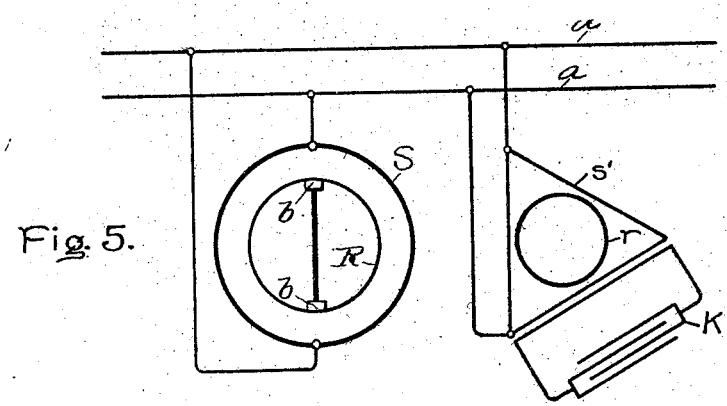

Figure 1 shows a side elevation of an alternating-current motor arranged in accordance with my invention, a portion of the field structure being broken away. Fig. 2 is a development of the rotor-winding, the commutator and brushes being indicated diagrammatically. Fig. 3 is a diagram showing a circuit arrangement adapted to my invention. Fig. 4 is a modification thereof, and Fig. 5 is a still further modification.

In the drawings, S represents the stator or primary member of the motor, which is supplied with single-phase alternating current.

R represents the rotor, which is provided with a commutator C and the short-circuiting brushes *b b*. Mounted on the same shaft with the rotor R is an auxiliary rotor *r*, which is in inductive relation to the auxiliary stator-winding *s* of the small rotor *r* and is connected to the winding of the main rotor R, as shown in Fig. 2. In this figure the rotor-winding R is developed on a plane surface and is shown as the well-known series type of winding. The winding *r* is shown as consisting of a similar winding, each coil being connected to an opposite coil on the main rotor-winding R. C represents the commutator, and *b b* the short-circuiting brushes, of the main rotor. It will be seen that the developed winding, as shown, is adapted for a four-pole machine.

It is evident from an inspection of Fig. 2 that any coil of auxiliary winding *r*, the terminals of which are connected to points on the main winding R, which at any instant are opposite short-circuiting brushes *b b*, will have its circuit completed by the short-circuiting brushes and their connections. On the other hand, any coil of winding *r*, the terminals of which are connected to points on the main winding R, which at any instant are midway between pairs of short-circuiting brushes *b b*, can have its circuit completed only through the main rotor-winding.

Referring now to Fig. 3, the connections of the various windings are diagrammatically shown. S represents the main stator, which is connected in series with the auxiliary stator *s* to the source of current *a a*. R represents the main rotor, short-circuited by the brushes *b b* on the line of magnetization of the stator. *r* represents the auxiliary rotor, each conductor of which is connected to a directly-opposite conductor on the rotor R, as has already been explained. It will be seen that the points of connection of the auxiliary stator *s* are displaced ninety electrical degrees from the points of connection of the main stator S. These lines of magnetization of the two stators are displaced by ninety electrical degrees. The operation is then as follows: The winding of auxiliary stator *s* produces a magnetization on the line of its terminals. This produces an electromotive force along the same line in the auxiliary rotor r, and since the conductors of the rotor r are connected to the opposite conductors on the rotor R this electromotive force, which is induced in rotor r on the line of the terminals of stator s, impresses an electromotive force on the main rotor R, displaced ninety electrical degrees from the line of short-circuited brushes. In other words, by means of the auxiliary stator and rotor an electromotive force is impressed upon the rotor R in the same manner as if an auxiliary set of brushes were employed. Furthermore, it will be seen that this electromotive force is of the proper phase and magnitude for varying speeds and loads of the main motor. Since the stator s is connected in series with the main stator S, the field of stator s is in phase with the currents in stator S and is also proportional in magnitude to these currents. Consequently the electromotive force induced in rotor r and impressed upon the main rotor R varies both in phase and magnitude with the motor-currents. It has been seen that this is one of the requisites for proper compensation. Furthermore, with a given strength of field in stator s the electromotive force induced in rotor r and impressed upon the rotor R is inversely proportional to the speed of the main motor. As has been seen, this is the second requisite for proper compensation.

It has been said that for proper compensation the compensating electromotive force should vary in phase and magnitude with the motor-currents. Speaking more accurately, it should be said that the variation should occur with the rotor-currents. In the arrangement of Fig. 3 the variation occurs with the stator-currents, which is only approximately correct, since the stator and rotor currents do not undergo precisely similar variations in magnitude and phase.

In the arrangement shown in Fig. 4 the auxiliary stator s is connected in series with the rotor R, and thereby variation of the auxiliary stator-field with the rotor-currents is secured.

In addition to the electromotive force induced by transformer action in rotor r on the line of the terminals of stator s there is a second electromotive force induced in rotor r on a line at right angles to the line of the stator-terminals s, due to cutting the field of stator s. The current, due to this electromotive force, passes directly through the short-circuiting brushes b b of the main rotor and has no effect upon the magnetization of the main motor. It acts, however, to produce in the auxiliary motor or exciter a revolving field which becomes more uniform as the motor-speed approaches synchronism. This revolving field serves to decrease the self-induction of the rotor r, and thereby improves the power factor of the motor. With a single-phase excitation the revolving field is not absolutely uniform until synchronous speed is reached; but, if desired, the auxiliary motor or exciter may be arranged to produce a revolving field at all speeds. Thus in Fig. 5 a further modification is shown, in which the auxiliary rotor r is excited by a polyphase stator s' instead of the single-phase stator heretofore shown. The polyphase stator s' is connected to the single-phase source of supply and also to a phase-shifting device, such as a condenser K, in order to obtain a revolving field in the well-understood manner. With this arrangement the variation in voltage with variation in motor-speed is automatic, as in the former arrangements; but the variation with the motor-currents must be obtained by varying the voltage impressed upon the stator s' or by shifting the terminal connections, or both. These and other methods of regulations are well known in the art and requires no further description.

In the diagrams I have shown the rotor R short-circuited directly upon the line of the stator magnetization, the torque-producing current being obtained wholly from the auxiliary rotor. With this arrangement, however, synchronism is the limiting speed for the motor, since at synchronism no electromotive force is induced in rotor r and no torque-producing current flows in rotor R. It is by no means necessary, however, that the main rotor should be short-circuited directly upon the line of primary magnetization, but instead the brushes may be shifted to a line at an angle to the line of primary magnetization, as in the ordinary repulsion-motor. With this arrangement proper compensation may be obtained, as heretofore explained, while the operation of the motor at speeds above synchronism may be secured, if desired.

Various modifications may be made in the construction and arrangement of parts without departing from my invention, and in the appended claims I aim to cover all such modifications which are within the spirit and scope of my invention.

What I claim as new, and desire to secure by Letters Patent of the United States, is—

1. In an alternating-current motor, a primary winding supplied with alternating current, a secondary winding provided with a commutator and short-circuiting brushes, an auxiliary winding revolving with said secondary winding and electrically connected thereto, and means for inducing in said auxiliary winding an electromotive force adapted to produce a compensating current in said secondary winding.

2. In an alternating-current motor, a primary winding supplied with alternating current, a secondary winding provided with a commutator and short-circuiting brushes, an auxiliary winding revolving with said secondary winding and electrically connected thereto, and means for inducing in said auxiliary winding an electromotive force adapted to produce a compensating current in said secondary windings and having its maximum value at points displaced approximately ninety electrical degrees from the short-circuiting brushes.

3. In an alternating-current motor, a primary winding supplied with alternating current, a secondary winding provided with a commutator and short-circuiting brushes, an auxiliary winding revolving with said secondary winding and electrically connected thereto, and means for inducing in the said auxiliary winding an electromotive force varying inversely with the speed of the motor.

4. In an alternating-current motor, a primary winding supplied with alternating current, a secondary winding provided with a commutator and short-circuiting brushes, an auxiliary winding revolving with said secondary winding and electrically connected thereto, and means for inducing in said auxiliary winding an electromotive force varying in magnitude and phase with the motor-currents.

5. In an alternating-current motor, a primary winding supplied with alternating current, a secondary winding provided with a commutator and short-circuiting brushes, an auxiliary winding revolving with said secondary winding and electrically connected thereto, and means for inducing in said auxiliary winding an electromotive force varying inversely with the motor speed and varying in phase and magnitude with the motor-currents.

6. In an alternating-current motor, a main stator-winding, a main rotor-winding provided with a commutator and short-circuiting brushes, an auxiliary stator-winding in series with one of said main windings, and an auxiliary rotor-winding in inductive relations to said auxiliary stator-winding and electrically connected to said main rotor-winding.

7. In an alternating-current motor, a main stator-winding, a main rotor-winding provided with a commutator and short-circuiting brushes, an auxiliary rotor-winding electrically connected to said main rotor-winding, and means for inducing in said auxiliary rotor-winding an electromotive force adapted to produce a compensating current in said main rotor-winding and diminishing as the speed of the motor increases.

In witness whereof I have hereunto set my hand this 30th day of April, 1904.

ERNEST SCHWEIGER.

Witnesses:
BENJAMIN B. HULL
HELEN ORFORD.